(12) United States Patent
Schrecker et al.

(10) Patent No.: US 8,595,822 B2
(45) Date of Patent: Nov. 26, 2013

(54) SYSTEM AND METHOD FOR CLOUD BASED SCANNING FOR COMPUTER VULNERABILITIES IN A NETWORK ENVIRONMENT

(75) Inventors: Sven Schrecker, San Marcos, CA (US); Brian Robison, Klamath Falls, OR (US)

(73) Assignee: McAfee, Inc., Santa Clara, CA (US)

( * ) Notice: Subject to any disclaimer, the term of this patent is extended or adjusted under 35 U.S.C. 154(b) by 147 days.

(21) Appl. No.: 13/340,457

(22) Filed: Dec. 29, 2011

(65) Prior Publication Data

US 2013/0174246 A1 Jul. 4, 2013

(51) Int. Cl.
*G06F 9/00* (2006.01)
*G06F 15/16* (2006.01)
*G06F 17/00* (2006.01)

(52) U.S. Cl.
USPC .......................................................... 726/14

(58) Field of Classification Search
USPC .......................................................... 726/14
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 2005/0005169 A1 | 1/2005 | Kelekar | |
| 2005/0097199 A1 | 5/2005 | Woodard et al. | |
| 2007/0271360 A1 | 11/2007 | Sahita et al. | |
| 2008/0056487 A1 | 3/2008 | Akyol et al. | |
| 2009/0235359 A1 | 9/2009 | Abdulhayoglu et al. | |

OTHER PUBLICATIONS

Information Technology Risk Management, Copyright 2002, © Glen B. Alleman, Niwor, Colorado, 22 pages.
International Search Report and Written Opinion mailed Feb. 25, 2013 for International Application No. PCT/US2012/067064.

*Primary Examiner* — Kambiz Zand
*Assistant Examiner* — Stephen Sanders
(74) *Attorney, Agent, or Firm* — Patent Capital Group

(57) ABSTRACT

A method in one embodiment includes establishing a first secure tunnel between a scanner and a configuration manager, and a second secure tunnel between the scanner and a scan controller, where the scanner is located in a public network and the configuration manager and the scan controller are located in a private network, communicating scanner configuration information between the scanner and the configuration manager over the first secure tunnel, and communicating scan information between the scanner and the scan controller over the second secure tunnel. The secure tunnels may be established from within the private network, by forwarding a first origination port and a second origination port to a first destination port and a second destination port, respectively. The first and second origination ports may be located in the public network, and the first and second destination ports may be located in the private network.

22 Claims, 5 Drawing Sheets

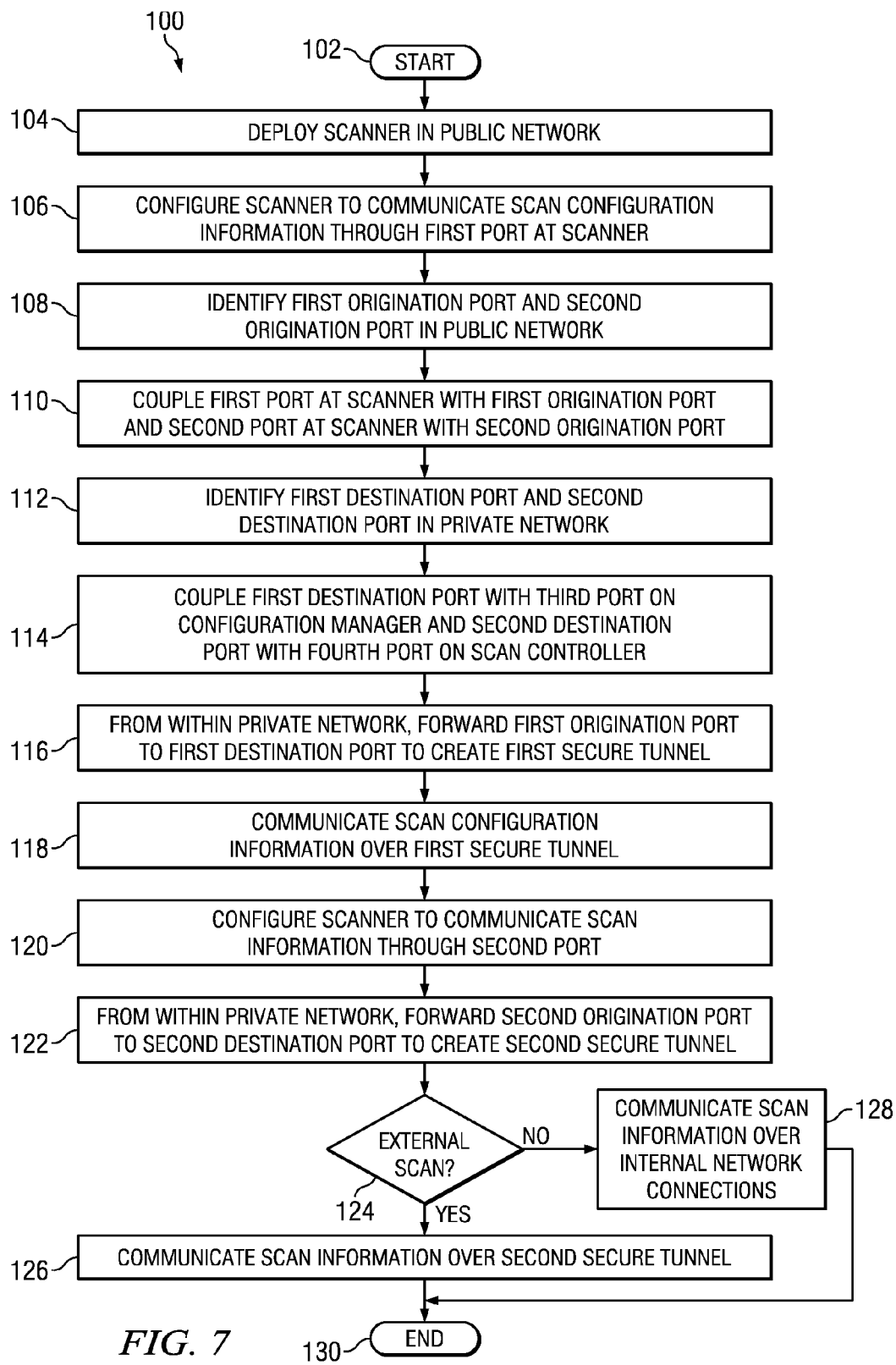

SYSTEM AND METHOD FOR CLOUD BASED SCANNING FOR COMPUTER VULNERABILITIES IN A NETWORK ENVIRONMENT

TECHNICAL FIELD

This disclosure relates in general to the field of computer networks and, more particularly, to a system and a method for cloud-based scanning for computer vulnerabilities in a network environment.

BACKGROUND

The field of computer network administration and support has become increasingly important and complicated in today's society. Computer network environments are configured for virtually every enterprise or organization, typically with multiple interconnected computers (e.g., end user computers, laptops, servers, printing devices, etc.). In many such enterprises, Information Technology (IT) administrators may be tasked with maintenance and control of the network environment, including executable software files on hosts, servers, and other network computers. As the number of executable software files in a network environment increases, the ability to control, maintain, and remediate these files efficiently can become more difficult. Generally, greater diversity of software implemented in various computers of a network translates into greater difficulty in managing such software. In addition, IT administrators and other users may want to use efficient computer scanning methods to identify and remove vulnerabilities quickly and effectively. When networks have hundreds to millions of nodes, scanning all the nodes for many possible vulnerabilities presents challenges to IT administrators. In many cases, IT administrators may have to run approximately 30,000 vulnerability checks covering thousands of applications and operating systems, and perform dozens to hundreds of new checks in any given week. Thus, innovative tools are needed to assist IT administrators in the effective control and management of executable software files and computer scan methods on computers within computer network environments.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 7 is a simplified flow-chart illustrating example operational steps that may be associated with embodiments of the present disclosure.

DETAILED DESCRIPTION OF EXAMPLE EMBODIMENTS

Overview

A method in one embodiment includes establishing a first secure tunnel between a configuration manager and a scanner, and a second secure tunnel between a scan controller and the scanner, where the scanner is located in a public network and the configuration manager and the scan controller are located in a private network, communicating scanner configuration information between the scanner and the configuration manager over the first secure tunnel, and communicating scan information between the scanner and the scan controller over the second secure tunnel. The scan controller and the configuration manager may also communicate with one or more scanners located in the private network.

In specific embodiments, the method includes identifying a first origination port, a second origination port, a first destination port, and a second destination port, and forwarding, from within the private network, the first origination port to the first destination port to create the first secure tunnel, and the second origination port to the second destination port to create the second secure tunnel. The first origination port and second origination port are coupled to the scanner, the first destination port is coupled to the configuration manager, and second destination port is coupled to the scan controller. Further, the scanner may include a first port coupled to the first origination port and a second port coupled to the second origination port. In more specific embodiments, the method may include configuring the scanner to communicate scan information through the second port.

In yet other embodiments, the scanner may include a scan engine configured to scan one or more assets in the private network based on scan information provided by the scan controller, and a configuration agent configured to facilitate configuring the scan engine based on scanner configuration information provided by the configuration manager. In more specific embodiments, the secure tunnels may comprise reverse secure shell (SSH) tunnels. The scanner may also include an SSH server, and other features.

Example Embodiments

Figure 1:
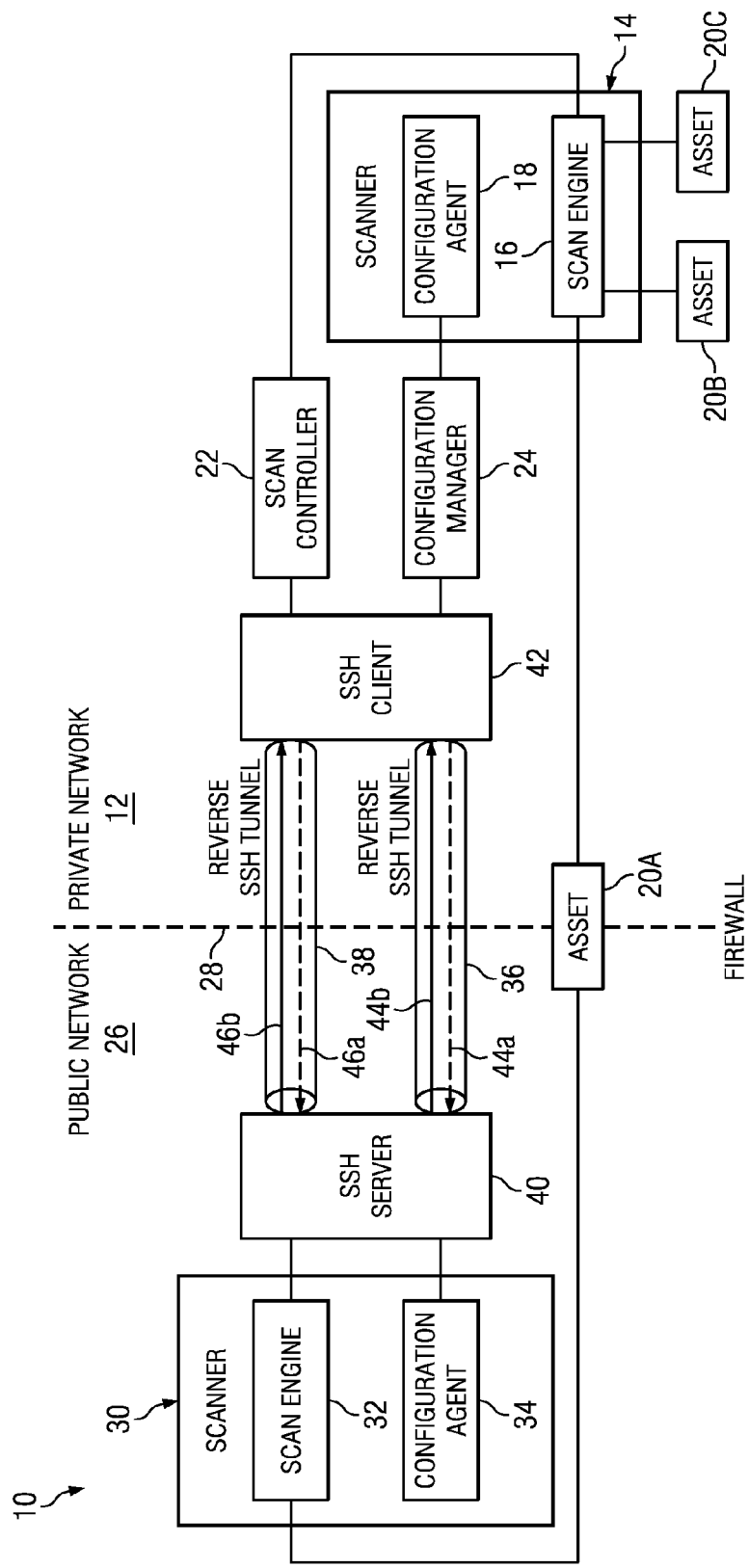
FIG. 1 is a simplified block diagram of an exemplary embodiment of a system for cloud-based scanning for computer vulnerabilities in a network environment.

FIG. 1 is a simplified block diagram illustrating an example embodiment of a system 10 for cloud-based scanning for computer vulnerabilities in a network environment. The exemplary network environment illustrates a private network 12 comprising one or more scanners 14 that includes a scan engine 16 and a configuration agent 18 to scan various assets 20A-C for vulnerabilities. Although only three assets are shown in FIG. 1 for illustrative purposes, any number of assets may be included in system 10 within the broad scope of the present disclosure. Certain assets within private network 12, such as asset 20A may be deployed at the edge of private network 12 so as to be visible to users and/or systems outside private network 12, whereas certain other assets, such as assets 20B and 20C may be configured to be invisible to users and/or systems outside private network 12. For example, asset 20A may be a Web server, and assets 20B and 20C may desktop computers within private network 12. A scan controller 22 and a configuration manager 24 may communicate with scan engine 16 and configuration agent 18, respectively. In various embodiments, scan controller 22 and configuration manager 24 may be located on the same or different servers within private network 12.

Private network 12 may be separated from a public network 26 by a firewall 28. In FIG. 1, although firewall 28 is illustrated, it may be understood that any security feature that separates private network 12 from public network 26 may be used in system 10 without departing from the broad scope of the present disclosure. For example, switches, routers, packet filters, etc. may separate private network 12 from public network 26. A scanner 30 may be located in public network 26. One scanner is depicted in FIG. 1 merely for the sake of illustration, and not as a limitation, and any number of scanners may be deployed outside private network 12 within the scope of the present disclosure. Scanner 30 may comprise a scan engine 32 and a configuration agent 34. In various embodiments, scan engine 32 and configuration agent 34 may be substantially functionally equivalent to scan engine 16 and configuration agent 18, respectively. Embodiments of system 10 provide for establishing a secure tunnel 36 between configuration manager 24 and scanner 30. Embodiments of system 10 also provide for establishing a secure tunnel 38 between scan controller 22 and scanner 30. In some instances, a single secure tunnel, rather than two distinct tunnels 36, 38, can be established for communication between a public network-based scanner's 30 scan engine 32 and configuration agent 34 and a private network-based scan controller 22 and configuration manager 24 (as discussed in more detail below).

As used herein, a "secure tunnel" encompasses a communication protocol that secures a communication channel from unwanted and/or unauthorized intrusions and vulnerabilities, such as packet sniffing, data leakage, unauthorized modification while in transit, etc. In the embodiment shown in FIG. 1, each secure tunnel can include a reverse Secure Shell (SSH) tunnel. SSH is a network protocol for secure communication (e.g., data communication, remote shell services, remote login, command execution, and other secure network services) over, for instance, an insecure network (e.g., public network 26) between a network element running an SSH server program, such as an SSH server 40, and another network element running an SSH client program, such as an SSH client 42. Any other secure tunnels (e.g., SSL, IPSec, etc.) may be suitably used in system 10, without departing from the broad scope of the present disclosure. For illustrative purposes, reverse SSH tunnels are described herein in connection with embodiments of system 10.

Scan controller 22 may be configured to provide one or more scan instructions (and other scan information) to scan engine 16, and accept scan results from scan engine 16 over dedicated internal network connections (e.g., Ethernet, wireless connection, etc.) within private network 12. Scan controller 22 can accept scan requests (e.g., from users, network administrators, etc.), spool them to various scanners 14, monitors scanners 14, and accept scan results from scanners 14. For example, scan controller 22 can schedule scans for assets 20A-C and distribute scan instructions to scan engine 16 appropriately.

According to embodiments of system 10, scan controller 22 may also be configured to provide one or more scan instructions (and other scan information) to scan engine 32, and accept scan results (and other scan information) from scan engine 32 over a secure tunnel (e.g., secure tunnel 38). Scan engines 16, 32 can include program logic to scan assets 20A-C according to the scan instructions (and other scan information) dictated from scan controller 22. Such logic, when combined with other scan information from scan controller 22, can be used to perform scans including, for example, detecting open ports, determining running services, identifying the operating system, recording the MAC address, host name, and other information about the asset; processing and pattern-matching vulnerability definitions with data it finds on scanned assets in order to determine the presence or absence of the vulnerabilities; simulating malicious users or systems accessing an asset and monitoring response of the asset as a result of the simulated attack, etc.; among other examples.

Configuration manager 24 may be configured to provide one or more scanner configurations to configuration agent 18 over dedicated internal network connections in private network 12. Further, configuration manager 24 can provide scanner configurations to the configuration agents (e.g., configuration agent 34) of one or more remotely provided or cloud-based scanners (e.g., scanner 30) over secure tunnels (e.g., secure tunnel 36). Configuration agents 18 and 34 may operate as platforms to implement changes in configuration data used by scan engines 16 and 32, respectively, to update content such as tests and scripts; to update/patch scan engines 16 and 32, or configuration agent executables or configurations and then restart them if needed; to patch system operating systems (OS) or any other software on respective scanners; or any other administrative operations required to maintain scanners 14 and 30. In example embodiments, configuration agents 18 and 32 may use "pull" methodology to receive scanner configuration information from configuration manager 24. For example, configuration agent 18 may authenticate itself to configuration manager 24 over internal network connections before receiving any scanner configuration information.

Scan engines 16 and 32 may be generally updated frequently to implement new OS detection fingerprinting techniques and to provide new tests to detect the existence of vulnerabilities on an asset. Updating scan engines 16 and 32 may be facilitated by configuration agents 18 and 34, respectively. Configuration agents 18 and 34 can communicate with configuration manager 24 to obtain configuration settings for scan engines 16 and 32, respectively. For example, configuration agent 18 can obtain an update patch from configuration manager 24 and facilitate execution of the patch on scan engine 16. According to embodiments of the present disclosure, configuration manager 24 may also be configured to provide one or more scanner configurations (and other scanner configuration information) to configuration agent 34 over secure tunnel 36. The scanner configurations may be used to update content such as tests and scripts; to update/patch scan engines 16 and 32, or configuration agent executables or configurations and then restart them if needed; to patch the system OS or any other software on the respective scanners; or any other administrative operations required to maintain scanners 14 and 30.

Whereas scan engines 32 and 16 are both configured to scan assets (e.g., assets 20A-C), scan engine 32 may be able to scan for different or additional vulnerabilities compared to scan engine 16, based on its location outside private network 12. For example, asset 20A may be an email server located in private network 12. To devices located outside private network 12 (or on the perimeter, or in a DMZ), only certain ports on asset 20A may be visible. Moreover, firewall 28 may prevent users/systems outside private network 12 from accessing other ports in asset 20A. In contrast, to devices located inside private network 12, substantially all ports on asset 20A may be visible. A malicious user or system such as a hacker or other threat located outside private network 12 may have a substantially different view of asset 20A than scan engine 16 located within private network 12. Thus, vulnerabilities visible to the outside user or system may be ignored by scan engine 16 because of its location within private network 12 (e.g., scan engine's view is from within the private network, not outside the private network). On the other hand, scan engine 32, located outside private network 12, may have a substantially similar view of asset 20A as the outside user or system, thereby providing additional views of the asset and making the scanning more complete and valuable.

In another example, asset 20B may be a printer within private network 12, and supposedly inaccessible to devices outside private network 12. By scanning (or attempting to scan) asset 20B using scan engine 32, any vulnerabilities in asset 20B, for example, an unauthorized externally visible port, may be discovered. Thus, a vulnerability in inadvertently exposed systems, which would have otherwise gone unnoticed may be discovered by scan engine 32 located in public cloud 26. Another example is a server configuration port that allows remote configuration of the machine or application. The remote configuration may be permitted from within private network 12, where it is expected that the machine or application may be suitably managed; however, if the same port is visible from outside private network 12, an external user/system (e.g., hacker) may be able to access the machine and alter configurations without authorization.

The network environment illustrated in FIG. 1 may be generally configured or arranged to represent any communication architecture capable of electronically exchanging packets. In addition, private network 12 and public network 26 may also be configured to exchange packets with other networks such as, for example, other LANs. Other common network elements (e.g., email gateways, web gateways, routers, switches, loadbalancers, firewalls, etc.), may also be provisioned in the networks where appropriate and based on particular needs.

Certain terminologies are used with regard to the various embodiments of the present disclosure. An "asset" may be any electronic device, network element, mobile device, end-user computer, desktop, laptop, client, server, peer, service, application, or other object capable of sending, receiving, or forwarding information over communications channels in a network. As used herein, "scan information" includes scan instructions (e.g., instructions directed to vulnerabilities to test for, vulnerability scripts to run, and calculations to perform to produce a network security score), scan targets (e.g., assets 20A-C), scan configuration, tests to run, asset resolution data (e.g., taking an IP and returning the host name and operating system (OS)), scan results, and any other information that may be used to scan assets (e.g., assets 20A-C) and analyze scan results. As used herein, "scanner configuration information" includes scanner component configurations (e.g., configurations of scan engines, SSH server programs, operating systems, etc.), new versions of the scanner executables, OS updates to fix vulnerabilities on the scanner, new application programming interfaces to respect, list of vulnerabilities, certificates, updates, ports for communication, and any other configuration information that may be used for managing and maintaining the scanner (e.g., scanner 14, scanner 30, etc.).

As used herein, the term "vulnerability" encompasses any flaw, condition, security risk, or weakness in a system (e.g., hardware or software in an asset, including operating systems, applications, files, chipsets, hardware-implemented computing logic, configuration settings, etc.) that could result in unauthorized access to the system and a possible security breach or a violation of the system's security policy, organization standards, industry standards, government standards, or the like. Vulnerabilities can exist, for example, in system security procedures, system designs, operating systems, open ports, internal controls, hardware configurations, applications, configuration settings, etc. that could be exercised (accidentally triggered or intentionally exploited) and that could result in such breaches or violations. Examples of vulnerabilities include CVE-2011-2460, which is a flaw in Adobe Flash Player that allows attackers to execute arbitrary code or cause denial of service via unspecified vectors; CVE-2011-2016, which is an untrusted search path vulnerability in Windows Mail that allows local user to gain privileges via a Trojan horse DLL in a working directory; among tens of thousands of other vulnerabilities.

As used herein, a "private network" encompasses any network that is separated from other networks by a security feature, such as a firewall, network address translation (NAT), etc. Examples of private networks include enterprise, office, and home networks. Assets within the private network are typically easily accessible to users within that network. On the other hand, assets within the private network are not generally accessible (or even visible) to users/systems outside the private network.

Any network other than a private network is included in the term "public network." Public networks may encompass fully public networks, such as the Internet, and semi-private (or community) networks where multiple, disparate enterprises share a cloud infrastructure, and at least some assets within the cloud infrastructure are easily accessible to users from within and outside the cloud, and other networks not explicitly part of the private network. In public networks generally, a substantial number of assets are typically accessible (and viewable) by any user. For example, in the Internet network, all assets in the Internet are typically accessible by all users. Thus, assets within private cloud 12 may access assets in public cloud 26; however, assets in public cloud 26 may not access (or even see) assets in private cloud 12, unless the assets in private cloud 12 are specifically configured to be accessible or visible externally. Examples of such specifically configured assets in private networks include email and Web servers.

For purposes of illustrating the techniques of system 10, it is important to understand the activities and security concerns that may be present in a given network such as the network shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Typical network environments, both in organizations (e.g., businesses, schools, government organizations, etc.) and in homes, include a plurality of computers such as end user desktops, laptops, servers, network appliances, and the like, with each computer having an installed set of executable software. In large organizations, network environments may include hundreds or thousands of computers, which can span different buildings, cities, and/or geographical areas around the world. IT administrators are often tasked with the extraordinary responsibility of maintaining these computers and their software in a way that minimizes or eliminates disruption to the organization's activities.

One difficulty IT administrators face when managing a network environment is ensuring that their organization's network security complies with regulatory and industry standards in risk compliance. Companies are under considerable pressure to protect customer information, customer privacy, and sensitive business information against threats from cyber criminals, competitors, and network hackers. For example, business partners may demand increasingly tight compliance in implementing and enforcing IT policies, processes, and controls around key assets and sensitive information. Effective risk management may entail accurate and comprehensive visibility into a company's assets and business processes.

Such visibility may include detailed information on vulnerabilities (e.g., operating system or application exploitable flaws) in the network.

Currently available risk management software programs can maintain an up-to-date database of vulnerabilities, detect vulnerabilities, perform trend analyses and provide reports of the results. Most of such risk management software programs reside within a private network, and scan assets within the private network. Many assets within the private network may be visible externally (to public networks) by virtue of their functions. For example, email and Web servers may be visible to users in a public network in addition to users within the private network. Such assets offer a different view to the external users compared to the view offered to the internal users. For example, internal users may be able to view substantially all ports of the asset. In contrast, external users may be able to view only one port. By scanning the asset from within the private network, it may be difficult, if not impossible, to obtain an external view of the asset and check for vulnerabilities that may be exploited by an external user. A scanner located in a public network may be able to obtain an external view of the asset; however, current security features (e.g., firewalls) of private networks do not permit a scanner located outside the private network (e.g., in the cloud) to use typical communication techniques to interface with scan controllers and other systems located within the private network and provide the scan results to, or obtain scan configurations dynamically from, the private network (e.g., a scan controller located within the enterprise).

Deployment methodologies for setting up scan engines can include deploying the scan engine outside the private network (e.g., customer environment) with the scan controller inside the private network; and deploying the scan engine inside the private network with scan controller also inside. In both cases, there are potential communication challenges that may be circumvented in order to get a working system. The scan engine should be able to communicate with the configuration manager and the scan controller, but communication may be blocked due to various firewalls, routers, and proxies.

Security features of private networks, such as firewalls and NATs, prevent network elements (e.g., scan engines) located in public networks from initiating communication with network elements (e.g., scan controllers) within the private network. On the other hand, the security features may permit the network elements located within the private network to initiate communication with assets in the public network. Nevertheless, Virtual Private Network (VPN) and reverse SSH tunnels can permit network elements external to the private network to maintain communication (across a firewall and/or NAT) with network elements within the private network. However, VPN offers network-to-network connectivity; with VPN enabled between the public network and private network, any network element located in the public network may be able to connect to any other network element located in the private network. If a VPN solution were to be deployed on a scan engine located in a public network (such as the Internet cloud), any user from within the cloud may be able to access devices located in the private network, thereby compromising the security of the private network.

Reverse SSH tunnels can also permit network elements external to private networks to initiate communication with assets in the private network while providing a more targeted and precise tunneling solution compared to VPNs. Regular SSH tunneling opens a port on a local machine (e.g., in a private network) and forwards connections from that port on the local machine to a corresponding port on a remote machine on the other end of the connection (e.g., in a public network). Communications to the port on the local machine get forwarded across the SSH tunnel to the corresponding port on the remote machine. In a "reverse" SSH tunnel, a port is opened on the remote machine (e.g., in a public network), and forwarded to a corresponding port on the local machine (e.g., in a private network). Communications to the port on the remote machine get forwarded across the reverse SSH tunnel to the corresponding port on the local machine, within the private network. Moreover, unlike a VPN connection that is a network-to-network connection, a reverse SSH tunnel is a point-to-point connection.

An SSH server running an SSH server program can connect across an SSH tunnel to an SSH client running an SSH client program. The SSH server program (also called SSH daemon) permits the SSH server to accept connections using the SSH protocol from remote computers. The SSH client program permits the SSH client to connect to a remote computer using the SSH protocol. SSH can use public-key cryptography to authenticate the remote computer and allow it to authenticate the user, in certain instances. Anyone can produce a matching pair of different keys (public and private). The public key is placed on all computers that allows access to the owner of the matching private key (the owner keeps the private key secret). SSH is typically used to log into a remote machine and execute commands, and it also supports tunneling; forwarding TCP ports and X11 connections; file transfers using the associated SSH file transfer (SFTP) or secure copy (SCP) protocols; among other functionality and features.

In some instances, a server or other device located in a public network cannot initiate a communication with another server located in a private network to thereby establish an SSH tunnel. Accordingly, in such instances, a reverse SSH tunnel may be established from the server in the private network to the server in the public network. From the SSH client (located in the private network), an origination port on the SSH server (located in the public network) may be opened for listening, and all connections to the origination port may be forwarded to a destination port on the SSH client. In many operating systems, a command such as the following on the SSH client may set a reverse SSH port forwarding from example origination port 10002 on SSH server remotehost at IP address 1.1.1.1 to example destination port 22 on SSH client: ssh -R remotehost:10002 localhost:22 1.1.1.1. All connections to origination port 10002 at 1.1.1.1 are forwarded to destination port 22 on the protected SSH client in the private network.

Currently available scan technologies may implement the scan controller on the cloud and the scan controller can control one or more scan engines located within the private network, for example, using SSL. However, such scan systems cannot work if the scan controller is within the private network, as is usually the case in many traditional enterprise scanning systems. Further, currently available scan technologies also implement a cloud based scanning, wherein a scan system, comprising a scan controller and scan engines are located in the public network and can scan assets in private network for certain limited number of vulnerabilities. Such scanners typically cannot access assets within the private network that are not visible externally; they also operate separately from any scanning systems deployed within the private network. Many users, for various reasons (e.g., improved scanning, efficiency, value, etc.), may desire to have a traditional scan system wherein the scan controller and at least some scan engines are located within the private network, while other scan engines, also controlled by the internal scan controller, are located outside the private network to provide an external view of certain assets.

System 10 outlined by FIG. 1 can resolve many of these issues. According to an embodiment of the present disclosure, one or more secure tunnels (e.g., secure tunnels 36, 38) may be established between scanner 30 (located in public network 26), and configuration manager 24, and scan controller 22, both located in private network 12. In one embodiment of the present disclosure, a secure tunnel (e.g., secure tunnel 36, secure tunnel 38) can include reverse SSH tunnels. In one particular example, such as shown in the particular example embodiment of FIG. 1, a first secure tunnel 36 can be established between configuration manager 24 and configuration agent 34; and a second secure tunnel 38 can be established between scan controller 22 and scan engine 32. According to embodiments of the present disclosure, communication is initiated by scanner 30 and passes through secure tunnels 36 and 38.

According to an example embodiment, secure tunnel 36 may be created from within private network 12 to public network 26 over connection 44a (e.g., from SSH client 42 to SSH server 40), and configuration agent 34 may subsequently initiate and maintain communication over connection 44b (e.g., from SSH server 40 to SSH client 42) via secure tunnel 36. Secure tunnel 38 may be created from within private network 12 to public network 26 over connection 46a (e.g., from SSH client 42 to SSH server 40), and scan engine 32 may subsequently initiate and maintain communication over connection 46b (e.g., from SSH server 40 to SSH client 42) via secure tunnel 38. Communication between scan engine 32 and scan controller 22 and between configuration agent 34 and configuration manager 24 may be request/response type, wherein scan engine 32 and configuration agent 34 request information from scan controller 22 and configuration manager 24, respectively, and obtain responses in return.

While the example of FIG. 1 illustrates two separate reverse SSH tunnels established between each of scan engine 32 and scan controller 22 and configuration agent 34 and configuration manager 24, other embodiments can adopt alternative architectures without deviating from the subject matter of the present disclosure or the principles described with regard to the establishing, maintaining, and communicating over secure tunnels. For instance, in some instances, scan controller 22 and configuration manager 24 can be implemented as a single component on private network 12 possessing the combined functionality of scan controller 22 and configuration manager 24. Further, a single secure tunnel, such as a single reverse SSH tunnel can be established between the combined scan controller and configuration manager and the scan engine 32 and configuration agent 34 of a scanner 30. In another example, a single reverse SSH tunnel can be established, in lieu of two separate tunnels, by providing an additional communication manager component (not shown) in private network 12 that cooperatively functions with scan controller 22 and configuration manager 24 and routes traffic received over the single secure tunnel from the scan engine 32 and configuration agent 34 to the scan controller 22 and configuration manager 24, respectively. Similarly, a communication manager component can also ensure that communications from the scan controller 22 or configuration manager 24 are addressed and properly forwarded to scan engine 32 and configuration agent 34, respectively, over the single secure tunnel enabling communication between scan controller 22 and configuration manager 24 and scanner 30, among other potential implementations.

In any of the above implementations, certain scan systems, including in embodiments of system 10, configuration manager 24 and scan controller 22 may communicate with scanners such as scanners 14 and 30 through distinct ports. In one example embodiment, configuration agents 18 and 34 may initiate communication with configuration manager 24 prior to scanning. Similarly, scan engines 16 and 32 may initiate communication with scan controller 22 prior to scanning. In other instances, scan controller 22 can initiate communications with a respective scan engine 16, 32 and similarly, configuration manager 24 can initiate communication with respective configuration agents 18, 34. Further, configuration manager 24 can listen on a specific port (e.g., port number "3803" for Direct Internet Message Encapsulation (DIME)/SSL connections; likewise, scan controller 22 can listen on another specific port (e.g., port number "3801" for Hyper Text Transfer Protocol (HTTP)/SSL connections.

In another example, configuration manager 24, at example IP address 1.1.1.1 may be configured to communicate scanner configuration information through port number "3801," and scan controller 22, also at example IP address 1.1.1.1 may be configured to communicate scan information through port number "3803." Inside private network 12, configuration agent 18 typically checks for updates through port number "3801" at 1.1.1.1, and scan engine 16 typically checks for scan instructions through port "3803" at 1.1.1.1.

According to embodiments of system 10, outside private network 12 (e.g., in public network 26), configuration agent 34 and scan engine 32 may be configured to check for scanner configuration information and scan information, respectively, through local ports rather than through remote ports. For example, configuration agent 34 may be configured to listen on a local port (e.g., port number "38010") and scan engine 32 may be configured to listen on another local port number (e.g., port number "38010"). In various embodiments, the local port (e.g., localhost:38010) on configuration agent 34 may be forwarded to another port (e.g., port number 3801 at 1.1.1.1) on configuration manager 24 through secure tunnel 36 for communicating scanner configuration information. Likewise, the local port e.g., localhost:38030) on scan engine 32 may be forwarded to a corresponding port (e.g., port number 3803 at 1.1.1.1) on scan controller 22 through secure tunnel 38 for communicating scan information.

In various embodiments, components (e.g., OpenSSH, etc.) to facilitate creation of secure tunnels 36 and 38 may be installed on scanner 30. Scanner 30, configured with such components may be generically redistributable (e.g., as a disk image, virtual machine, a cloud instance such as Amazon Cloud Instance (AMI), etc.). Corresponding client software (e.g., SSH Client) may be installed on devices within private network 12 to facilitate creation of secure tunnels 36 and 38. For example, a command such as ssh -TNfR 38010:localhost:3801 remote.engine.com may create reverse tunnel 36 from local configuration manager port (e.g., port number "3801") to remote engine port (e.g., port number "38010") on configuration agent 34. Similarly, a command such as ssh -TNfR 38030:localhost:3803 remote.engine.com may create reverse tunnel 38 from local scan controller port (e.g., port number "3803") to remote port (e.g., port number "38030") on scan engine 32. The connection into private network 12 can then be initiated from public network 26 over either tunnel 36 or 38, but from the perspective of scanner 30, scanner 30 would be initiating communication over secure tunnels 36 and 38 to scan controller 22 and configuration manager 24.

Turning to the infrastructure of FIG. 1, the example network environment may be configured as one or more networks and may be configured in any form including, but not limited to, local area networks (LANs), wireless local area networks (WLANs), metropolitan area networks (MANs), wide area networks (WANs), virtual private networks (VPNs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, a communication link may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In addition, gateways, routers, switches, and any other suitable network elements may be used to facilitate electronic communication between the various nodes. Note that the network illustrated in FIG. 1, may include a configuration capable of transmission control protocol/internet protocol (TCP/IP) communications for the transmission and/or reception of packets in the network. The network could also operate in conjunction with a user datagram protocol/IP (UDP/IP) or any other suitable protocol, where appropriate and based on particular needs. Only a few assets and networks are illustrated in FIG. 1, for ease of description. Any number of assets and networks may be included in system 10 within the broad scope of the present disclosure.

Scanner 30 may be implemented on a physical or virtualized hardware in public network 26, or may be implemented on specialized devices configured to scan networks or assets. Implementing scanner 30 using virtual machines can allow, among other advantages, for dynamic provisioning of a scanner for any one of a variety of systems or assets, thereby taking advantages of cloud-based extensibility and permitting on-demand provisioning and scaling of scanners 30. In various embodiments, configuration agent 34 may be coupled to, or in communication with, or integrated into, scan engine 32. In one embodiment, configuration agent 34 may be a software application (or part of a software application) that periodically polls configuration manager 24 for updates and other scanner configuration information. In some embodiments, configuration agent 34 may perform updates and other scan configuration changes on scan engine 32 automatically as and when such updates are received from configuration manager 24. In other embodiments, configuration agent 34 may perform updates and other scan configuration changes on scan engine 32 prior to a scan. In yet other embodiments, configuration agent 34 may perform updates and other scan configuration changes according to user specified rules.

In some embodiments, scanner 30 can be a logical object that consists of scan engine 32 and configuration agent 34. In other embodiments, scanner 30 can be a physical machine that includes scan engine 32 and configuration agent 34, as well as its own instance of SSH Server 40. For example, scanner 30 may be implemented on a server or virtual machine that also runs an SSH server program. In another example embodiment, scanner 30 may include an SSH server program. In yet other embodiments, scanner 30 may be implemented on a device separate from SSH server 40. For example, scanner 30 may be a separate network appliance that is connected to a server running an SSH server program. Various such combinations are possible within the broad scope of the present disclosure.

Not shown in system 10 of FIG. 1 is hardware that may be suitably coupled to scanner 30 in the form of consoles, user interfaces, processors, memory elements, memory management units (MMU), additional symmetric multiprocessing (SMP) elements, peripheral component interconnect (PCI) bus and corresponding bridges, small computer system interface (SCSI)/integrated drive electronics (IDE) elements, etc. In addition, suitable modems and/or network adapters may also be included for allowing network access. Any suitable operating systems may also be configured in scanner 30 to appropriately manage the operation of hardware components therein. Scanner 30 may include any other suitable hardware, software, components, modules, interfaces, or objects that facilitate the operations thereof. This may be inclusive of appropriate algorithms and communication protocols that facilitate the operations detailed herein.

Figure 2:
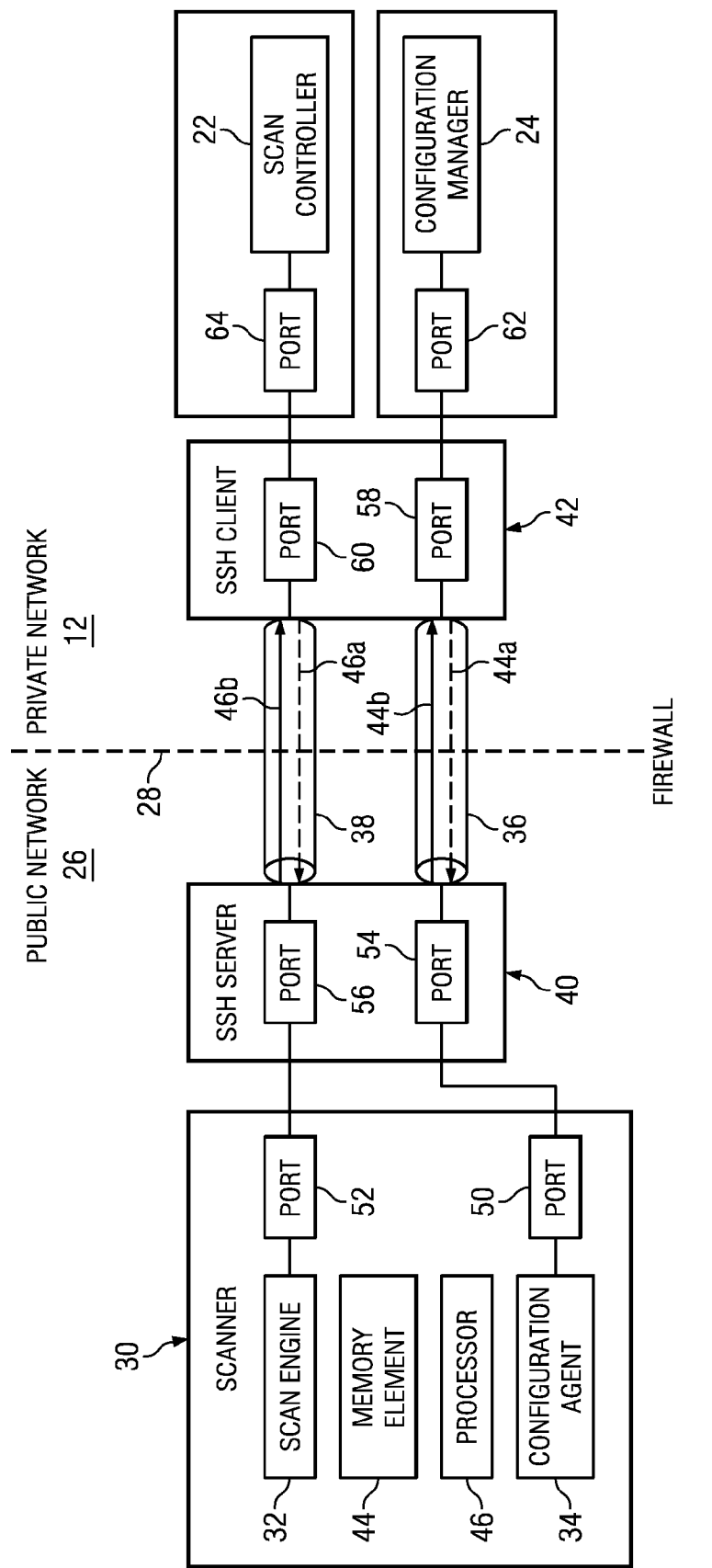
FIG. 2 is a simplified block diagram of details of an embodiment of the system.

Turning to FIG. 2, FIG. 2 is a simplified block diagram illustrating details of an embodiment of system 10. Scanner 30 can include a memory element 44 and a processor 46 in addition to scan engine 32 and configuration agent 34. Ports 50 and 52 may be two of a plurality of ports provided in (or coupled to, or otherwise communicable with) scanner 30. In some embodiments, ports 50 and 52 may be physical ports; in other embodiments, ports 50 and 52 may be virtual ports. In an example embodiment, scanner 30 may be implemented on a network element, such as a server. In another embodiment, scanner 30 may be a separate service appliance located in public network 26. Ports 50 and 52 on scanner 30 may communicate with origination ports 54 and 56, respectively, in SSH server 40. SSH client 42 may include destination ports 58 and 60 that may be used to establish secure tunnels 36 and 38 with origination ports 54 and 56, respectively. Destination ports 58 and 60 on SSH client 42 may communicate with (or be coupled to) corresponding port 62 on configuration manager 24 and port 64 on scan controller 22, respectively.

In some embodiments of system 10, port 54 may be combined with port 50, and port 56 may be combined with port 52. Such may be the case, for example, in embodiments where scanner 30 is implemented on a server running an SSH daemon (e.g., SSH server 40). In some embodiments, ports 58 and 60 may be combined with ports 62 and 64, respectively. Such may be the case, for example, in embodiments where a server including scan controller 22 and configuration manager 24 performs functions of SSH client 42 (e.g., connects to remote computers using the SSH protocol). Although the embodiment shown in FIG. 2 uses SSH server 40 and SSH client 42, it may be understood that any network element that can establish secure communication channels may be used instead in system 10 without departing from the scope of the present disclosure.

In one particular example, provided merely for the sake of illustrating certain principles, port 50 is numbered "38010" and port 52 is numbered "38030." According to an embodiment of system 10, configuration agent 34 may be configured to listen on port 50, which is coupled to origination port 54. In one embodiment, scanner 30 may be pre-configured before deployment in public network 26 to listen on port 50 on its loopback network interface (e.g., localhost, 127.0.0.1, etc.). Scanner 30 may be deployed in public network 26 (e.g., installed on a server in public network 26), and coupled to SSH server 40 such that ports 50 and 52 are coupled to origination ports 54 and 56, respectively. For example, port 50 and 52 may be connected (physically, or virtually) to origination ports 54 and 56, respectively.

In general, configuration manager 24 may be configured to communicate through port 62, and scan controller 22 may be configured to communicate through port 64. In an example embodiment, port 64 may be numbered "3801," and port 64 may be numbered "3803." All configuration agents (e.g., configuration agent 18) in private network 12 may communicate with configuration manager 24 through port number "3801," whereas all scan engines (e.g., scan engine 16) in private network 12 may communicate with scan controller 22 through port number "3803." In an example embodiment, destination ports 58 and 60 on SSH client 42 may be coupled (physically or virtually) to ports 62 and 64, respectively.

From within private network 12 (e.g., from SSH client 42), secure tunnel 36 may be created over connection 44a (e.g., using commands such as ssh -R remotehost:38010 localhost:3801 remote_host_IP), such that origination port 54 may be forwarded to destination port 58. Subsequently, all communication to port 50 may be transferred to origination port 54, from where it is tunneled to destination port 58 over connection 44b, and onto port 62. Unlike configuration agents (e.g., configuration agent 18) located within private network 12, configuration agent 34 may be configured to poll configuration manager through port 50 (e.g., port number "38010") at localhost rather than port 62 (e.g., port number "3801") at the configuration manager's IP address. For example, configuration agent 34 may authenticate itself to configuration manager 24 through port 50.

In various embodiments, configuration manager 24 may be configured to recognize that configuration agent 34 is located outside private network 12. Configuration manager 24 may instruct configuration agent 34 to configure scan engine 32 to listen on port 52 (e.g., port number "38030") at scanner 30 (e.g., localhost, 127.0.0.1, etc.) for scan information, rather than port 64 (e.g., port number "3803") at the scan controller's IP address for scan engines (e.g., scan engine 16) located within private network 12. From within private network 12 (e.g., from SSH client 42), secure tunnel 38 may be created over connection 46a (e.g., using commands such as ssh -R remotehost:38030 localhost:3803 remote_host_IP), such that origination port 56 may be forwarded to destination port 60. Scan controller 22 may send scan information through port 64 (e.g., port number "3803"), which is coupled to destination port 60. The scan information may be tunneled to origination port 56 over connection 46b via secure tunnel 38, from where it is received by scan engine 32 through port 52 (e.g., port number "38030"). Scan engine 32 listening on port 52 may pick up the scan information, and proceed to scan assets accordingly.

Scanning assets may be done through regular communication channels, outside secure tunnels 36 and 38. For instance, scanner 30 may perform scans over public network 26 (i.e., outside of a secure tunnel), for example, to simulate a device's attempt to access certain files, assets, networks, etc. of private network 12 using public network 26 (such as the Internet). Scan results can be generated by scanner 30 in response to the performance of the scan and reporting results of the scan. After scanning, scan engine 32 may then communicate the scan results through port 52, which gets tunneled over secure tunnel 38 to scan controller 22 through port 64, for consideration by scan controller 22, for instance, in connection with other scan results received from other scan performed by other scanners, including scanners (e.g., scanner 14) internal to the system (e.g., based in private network 12).

Figure 3:
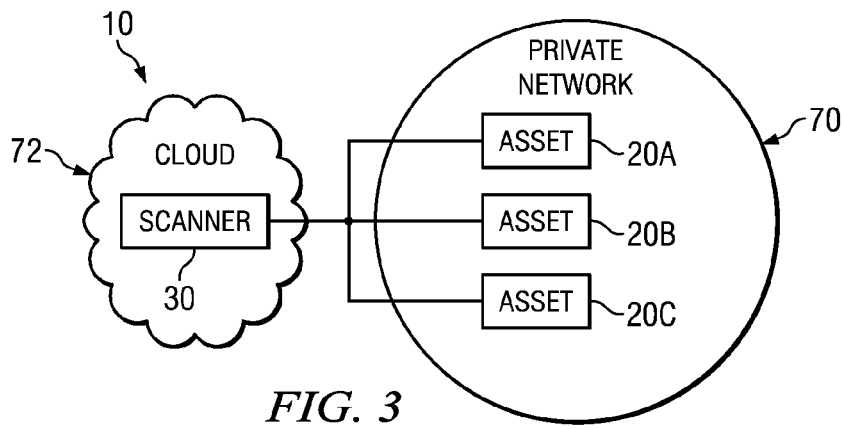
FIG. 3 is a simplified block diagram of another embodiment of the system.

Turning to FIG. 3, FIG. 3 is a simplified block diagram showing an embodiment of system 10. A private network 70 may include a plurality of assets 20A-C. Scanner 30 may be located in cloud 72, which may be based in a public network. Two secure tunnels 74 may form point-to-point connections between scanner 30 and a scan controller and configuration manager (not shown) within private network 70. Using scanner configuration information and scan information provided over secure tunnels 74, scanner 30 may scan plurality of assets 20A-C in private network 70. Although only a few assets are shown in FIG. 3, it may be understood that any number of assets may be used in system 10 within the broad scope of the present disclosure.

Figure 4:
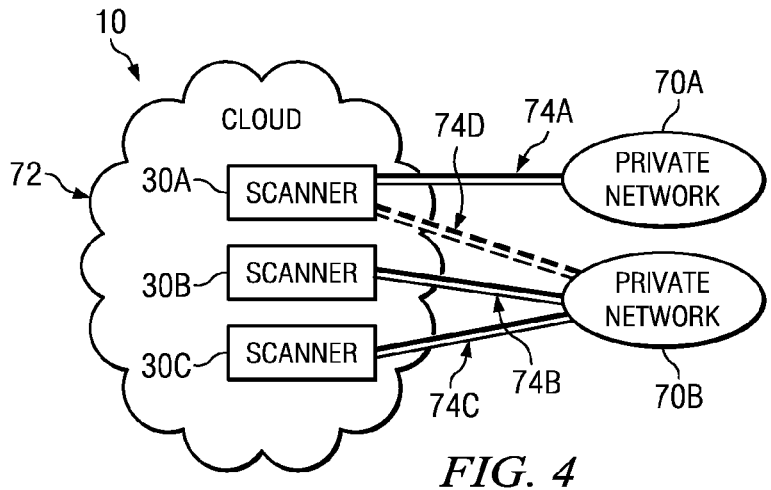
FIG. 4 is a simplified block diagram of yet another embodiment of the system.

Turning to FIG. 4, FIG. 4 is a simplified block diagram showing another embodiment of system 10. Two private networks 70A and 70B (e.g., of two distinct enterprises) may communicate with scanners 30A, 30B, and 30C provided in cloud 72, which may include a public network. According to one embodiment, scanner 30A may form two secure tunnels 74A connecting scanner 30A point-to-point with a scan controller and configuration manager (not shown) within private network 70A. Similarly, scanner 30B may form two secure tunnels 74B connecting scanner 30B point-to-point with a scan controller and configuration manager (not shown) within private network 70B. Scanner 30C may form two secure tunnels 74C connecting scanner 30C point-to-point with the scan controller and configuration manager within private network 70B. The configurations permit each scanner 30A-C to communicate through unique ports to the corresponding scan controllers and configuration managers within the respective private networks. Thus, each scanner 30A-C may be configured for use in each of the corresponding private networks 70A and 70B. In one embodiment, scanner 30A may be configured specifically for private network 70A, and may not be used with any other private networks in that configuration. In another embodiment, scanner 30A may be initially configured for private network 70A. Based on scan loads and other considerations as appropriate, scanner 30A may be reconfigured (e.g., as a virtual machine capable of being dynamically provisioned to replace configurations of one private network (e.g., 70A) with configurations of another private network (e.g., 70B)) to form two secure tunnels 74D with private network 70B.

Figure 5:
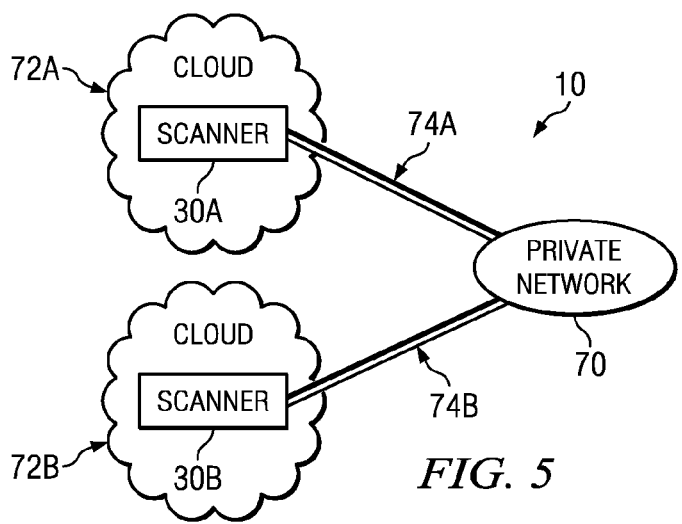
FIG. 5 is a simplified block diagram of yet another embodiment of the system.

Turning to FIG. 5, FIG. 5 is a simplified block diagram illustrating yet another embodiment of system 10. Scanners 30A and 30B may be located in distinct clouds 72A and 72B, respectively. The respective devices and systems implementing clouds 72A and 72B may be separated geographically; for example, cloud 72A may be located in the US, whereas cloud 72B may be located in China. Two separate sets of tunnels 74A and 74B may be established between respective scanners 30A and 30B with private network 70. In various embodiments, it may be desired to scan assets in private network 70 from different geographical locations (for example, to determine whether any additional vulnerabilities are present when accessed from one location as compared to the other location). Scanners 30A and 30B may be used to scan assets in private network 70, for example, to provide a comparison of vulnerabilities for accesses from different geographical locations.

Figure 6:
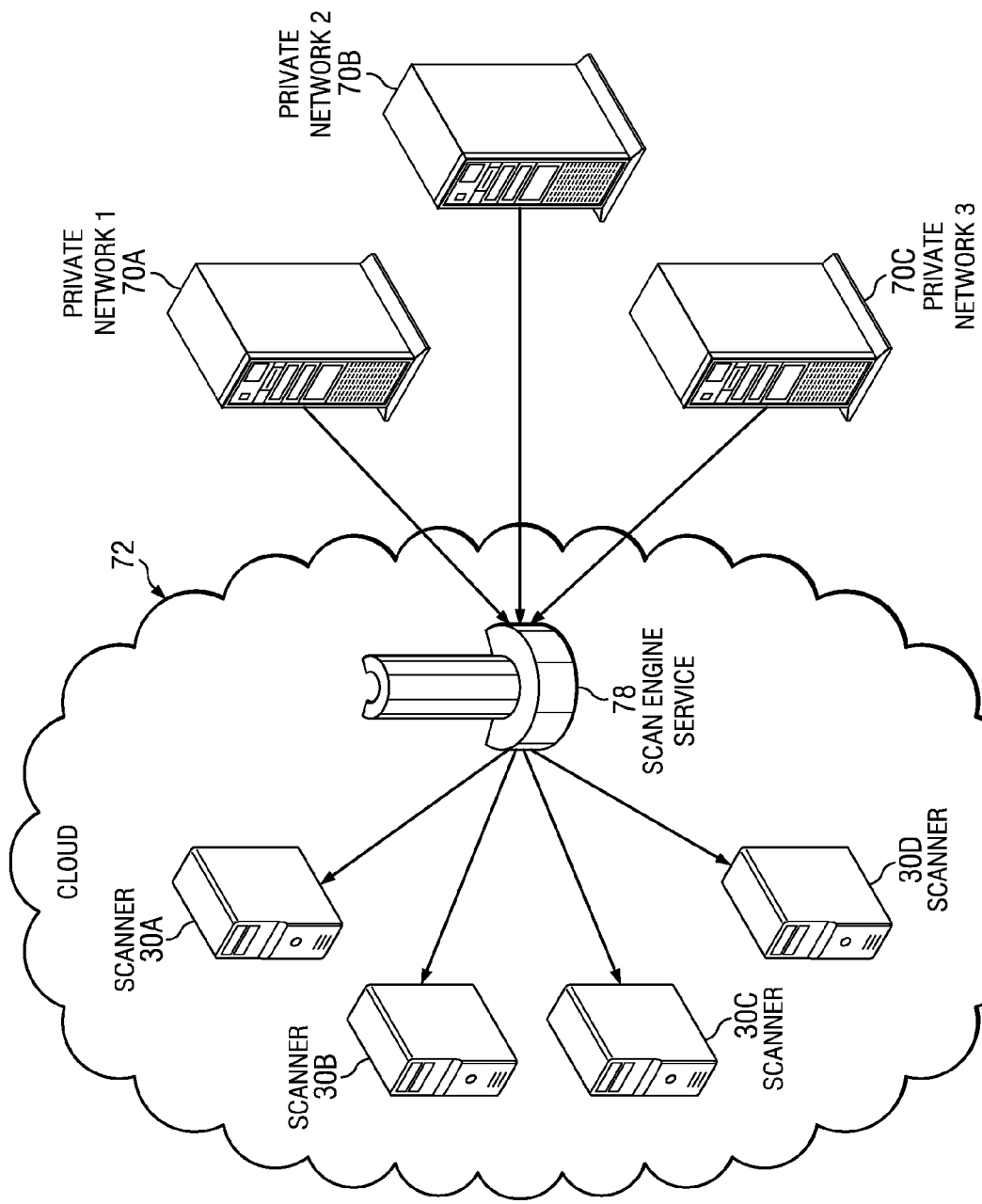
FIG. 6 is a simplified block diagram of yet another embodiment of the system.

Turning to FIG. 6, FIG. 6 is a simplified block diagram illustrating yet another example embodiment of system 10. A scan engine service 78 may be provisioned in cloud 72. A cluster of scanners 30A-D may be managed by scan engine service 78. A plurality of private networks 70A, 70B and 70C (e.g., belonging to distinct enterprises) may use scan engine service 78. Each scanner 30A, 30B, 30C or 30D may be shared by multiple private networks (e.g., 70A and 70B, or 70A-C, etc.) Rather than using (and configuring) a specific scanner, respective scan controllers and other scan components located within private network 12 may use scanning services provided by scan engine service 78.

Turning to FIG. 7, FIG. 7 is a simplified flow-chart illustrating operational steps that may be associated with embodiments of the present disclosure. Operations 100 begin at 102, when system 10 is activated. At 104, scanner 30 may be deployed in public network 26. At 106, scanner 30 may be configured to communicate scanner configuration information on a first port (e.g., port 50) at scanner 30. In various embodiments, scanner 30 may be pre-configured (e.g., at factory, software development site, launch on the cloud, etc.) to communicate through the first port for scanner configuration information. At 108, a first origination port (e.g., port 54) and a second origination port (e.g., port 56) may be identified in public network 26. In some embodiments, the first origination port may be identical to the first port, and the second origination port may be identical to the second port. In other embodiments, the first origination port and the first port may be separate ports on a single device; likewise, the second origination port and the second port may be separate ports on a single device. In yet other embodiments, the first origination port may be located on a device that is separate and distinct from the device on which the first port is located. Likewise, the second origination port may be located on a device that is separate and distinct from the device on which the second port is located. "Identifying" includes determining the IP address of the device on which the port is located and the port number.

At 110, the first port (e.g., port 50) at scanner 30 is coupled to the first origination port (e.g., port 54) and the second port (e.g., port 52) is coupled to the second origination port (e.g., port 56). In some embodiments, the coupling can be physical (e.g., by attaching wires, or a wireless connection), or virtual (e.g., by appropriate commands). Coupling the ports can enable one-to-one communication between the coupled ports, so that data at one port is translated directly to the coupled port across a communication link, without requiring advanced communication techniques, such as port forwarding.

At 112, a first destination port (e.g., port 58) and a second destination port (e.g., port 60) are identified in private network 12. At 114, the first destination port (e.g., port 58) is coupled to a third port (e.g., port 62) at configuration manager 24 and second destination port (e.g., port 60) is coupled to a fourth port (e.g., port 64) at scan controller 22. In some embodiments, the first destination port may be identical to the third port, and the second destination port may be identical to the fourth port. In other embodiments, the first destination port and the third port may be separate ports on a single device; likewise, the second destination port and the fourth port may be separate ports on a single device. In yet other embodiments, the first destination port may be located on a device that is separate and distinct from the device on which the third port is located. Likewise, the second destination port may be located on a device that is separate and distinct from the device on which the fourth port is located.

At 116, from within private network 12, the first origination port (e.g., port 54) may be forwarded to first destination port over a first secure tunnel (e.g., secure tunnel 36). Thus, all communication received at the first origination port (e.g., port 54) may be forwarded across the first secure tunnel to the first destination port (e.g., port 58). Because the first origination port (e.g., port 54) is coupled to the first port (e.g., port 50) at scanner 30, and the first destination port (e.g., port 58) is coupled to the third port (e.g., port 62) at configuration manager 24, all communication through the first port (e.g., port 50) is forwarded to the third port (e.g., port 64) over the first secure tunnel (e.g., secure tunnel 36).

At 118, scanner configuration information may be communicated between configuration manager 24 and configuration agent 34 in scanner 30 over the first secure tunnel. For example, configuration agent 34 may authenticate itself to configuration manager 24 or poll configuration manager 24 through port 50 (e.g., localhost:38010). Configuration manager 24 may communicate scanner configuration information through port 62 (e.g., port number 3801). The scanner configuration information provided by configuration manager 24 through port 62 is tunneled through the first secure tunnel (e.g., secure tunnel 36) and picked up by configuration agent 34. In some embodiments, configuration manager 24 may recognize that scanner 30 is located outside private network 12, and may instruct scanner 30 to communicate scan information through the second port (e.g., port 52).

At 120, scanner 30 may be configured to communicate scan information through the second port (e.g., port 52). At 122, from within private network 12, the second origination port (e.g., port 56) may be forwarded to the second destination port (e.g., port 60) to create a second secure tunnel (e.g., secure tunnel 38). Thus, all communication received at the second origination port (e.g., port 56) may be forwarded across the second secure tunnel (e.g., secure tunnel 38) to the second destination port (e.g., port 60). Because the second origination port (e.g., port 56) is coupled to the second port (e.g., port 52) at scanner 30, and the second destination port (e.g., port 60) is coupled to the fourth port (e.g., port 64) at scan controller 22, all communication through the second port (e.g., port 52) is forwarded to the fourth port (e.g., port 64) over the second secure tunnel (e.g., secure tunnel 38).

At 124, a determination may be made (e.g., at scan controller 22) whether an external scan on an asset may be performed. If external scan is chosen, scan controller 22 may communicate scan information over the second secure tunnel (e.g., secure tunnel 38) to scan engine 32 in scanner 30 located in public network 26. Scanner 30 may perform an external scan of assets according to scan instructions and other scan information provided by scan controller 22. Scan engine 32 may communicate scan results and other scan information to scan controller 22 over the second secure tunnel (e.g., secure tunnel 38).

On the other hand, if an internal scan is chosen, scan controller 22 may communicate scan information over internal network connections to scan engine 18, in scanner 14, located within private network 12. Scanner 14 may perform an internal scan of assets according to scan instructions and other scan information provided by scan controller 22. Scan engine 18 may communicate scan results and other scan information to scan controller 22 over internal network connections. The operations end at 130.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

The options, as shown in the FIGURES herein, are for example purposes only. It will be appreciated that numerous other options, at least some of which are detailed herein in this Specification, may be provided in any combination with or exclusive of the options of the various FIGURES. Software for achieving the operations outlined herein can be provided at various locations (e.g., the corporate IT headquarters, end user computers, distributed servers in the cloud, etc.). In some embodiments, this software could be received or downloaded from a web server (e.g., in the context of purchasing individual end-user licenses for separate networks, devices, servers, etc.) in order to provide this system. In one example embodiment, this software is resident in one or more computers and/or web hosts sought to be protected from a security attack (or protected from unwanted or unauthorized manipulations of data).

In various embodiments, the software of system 10 could involve a proprietary element (e.g., as part of a network security solution with McAfee® Vulnerability Manager (MVM) software, McAfee® ePolicy Orchestrator (ePO) software, etc.), which could be provided in (or be proximate to) these identified elements, or be provided in any other device, server, network appliance, console, firewall, switch, information technology (IT) device, distributed server, etc., or be provided as a complementary solution, or otherwise provisioned in the network.

In certain example embodiments, the activities as outlined herein may be implemented in software. This could be inclusive of software provided in scanner 30 and in other network elements (e.g., scan engine 16). These elements and/or modules can cooperate with each other in order to perform the activities related to grouping computer vulnerabilities as discussed herein. In other embodiments, these features may be provided external to these elements, included in other devices to achieve these intended functionalities, or consolidated in any appropriate manner. For example, some of the processors associated with the various elements may be removed, or otherwise consolidated such that a single processor and a single memory location are responsible for certain activities. In a general sense, the arrangement depicted in FIGURES may be more logical in its representation, whereas a physical architecture may include various permutations, combinations, and/or hybrids of these elements.

In various embodiments, some or all of these elements include software (or reciprocating software) that can coordinate, manage, or otherwise cooperate in order to achieve the operations as outlined herein. One or more of these elements may include any suitable algorithms, hardware, software, components, modules, interfaces, or objects that facilitate the operations thereof. In the embodiment involving software, such a configuration may be inclusive of logic encoded in one or more tangible media, which may be inclusive of non-transitory media (e.g., embedded logic provided in an application specific integrated circuit (ASIC), digital signal processor (DSP) instructions, software (potentially inclusive of object code and source code) to be executed by a processor, or other similar machine, etc.).

In some of these instances, one or more memory elements (e.g., memory element 44) can store data used for executing the operations described herein. This includes the memory element being able to store software, logic, code, or processor instructions that are executed to carry out the activities described in this Specification. A processor can execute any type of instructions associated with the data to achieve the operations detailed herein in this Specification. In one example, processor 46 could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

System 10 and other associated components in system 10 can include one or more memory elements (e.g., memory element 44) for storing information as outlined herein. Information may be kept in any suitable type of memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in system 10 could be provided in any database, register, table, cache, queue, control list, or storage structure, based on particular needs and embodiments, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.' Each of the computers may also include suitable interfaces for receiving, transmitting, and/or otherwise communicating data or information in a network environment.

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the illustrated computers, modules, components, and elements of FIGURES may be combined in various possible configurations, all of which are clearly within the broad scope of this Specification. In certain cases, it may be easier to describe one or more of the functionalities of a given set of flows by only referencing a limited number of network elements. It should be appreciated that the system of FIGURES (and corresponding teachings) is readily scalable and can accommodate a large number of components, as well as more complicated/sophisticated arrangements and configurations. Accordingly, the examples provided should not limit the scope or inhibit the broad teachings of system 10 as potentially applied to a myriad of other architectures.

It is also important to note that the operations described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

What is claimed is:

1. A method comprising:
   establishing a first secure tunnel between a configuration manager and a scanner, and a second secure tunnel between a scan controller and the scanner, wherein the scanner is located in a public network and the configuration manager and the scan controller are located in a private network;

communicating scanner configuration information between the scanner and the configuration manager over the first secure tunnel; and communicating scan information between the scanner and the scan controller over the second secure tunnel.

2. The method of claim 1, wherein each secure tunnel is a reverse Secure Shell (SSH) tunnel.

3. The method of claim 1, wherein establishing the first secure tunnel and the second secure tunnel comprises:

identifying a first origination port, a second origination port, a first destination port, and a second destination port, wherein the first origination port and second origination port are coupled to the scanner, the first destination port is coupled to the configuration manager, and second destination port is coupled to the scan controller; and forwarding, from within the private network, the first origination port to the first destination port to create the first secure tunnel, and the second origination port to the second destination port to create the second secure tunnel.

4. The method of claim 3, wherein the scanner comprises a first port coupled to the first origination port and a second port coupled to the second origination port.

5. The method of claim 4, further comprising:

configuring the scanner to communicate scan information through the second port.

6. The method of claim 1, wherein the scanner comprises:

a scan engine configured to scan one or more assets in the private network based on scan information provided by the scan controller; and a configuration agent configured to facilitate configuring the scan engine based on scanner configuration information provided by the configuration manager.

7. The method of claim 6, wherein the scanner further comprises:

an SSH server.

8. The method of claim 1, wherein the scan controller and the configuration manager communicate with one or more scanners located in the private network.

9. The method of claim 1, wherein the first and second secure tunnels are the same tunnel.

10. The method of claim 1, wherein the first secure tunnel is distinct from the second secure tunnel.

11. An apparatus comprising:
a scan engine;
a configuration agent;
a first port;
a second port;
a memory element configured to store data; and
a processor operable to execute instructions associated with the data, wherein the apparatus is configured for:
establishing a first secure tunnel between a configuration manager and the configuration agent, and a second secure tunnel between a scan controller and the scan engine, wherein the apparatus is located in a public network and the configuration manager and the scan controller are located in a private network;
communicating scanner configuration information between the configuration agent and the configuration manager over the first secure tunnel; and
communicating scan information between the scan engine and the scan controller over the second secure tunnel.

12. The apparatus of claim 11, wherein each secure tunnel is a reverse Secure Shell (SSH) tunnel.

13. The apparatus of claim 11, wherein the scan engine is configured to scan one or more assets in the private network based on scan information provided by the scan controller, and the configuration agent is configured to facilitate configuring the scan engine based on scanner configuration information provided by the configuration manager.

14. The apparatus of claim 11, wherein establishing the first secure tunnel and the second secure tunnel comprises:

identifying a first origination port, a second origination port, a first destination port, and a second destination port, wherein the first origination port and second origination port are coupled to the apparatus, the first destination port is coupled to the configuration manager, and second destination port is coupled to the scan controller; and forwarding, from within the private network, the first origination port to the first destination port to create the first secure tunnel, and the second origination port to the second destination port to create the second secure tunnel.

15. The apparatus of claim 14, wherein the first port is coupled to the first origination port and the second port is coupled to the second origination port.

16. The apparatus of claim 15, further configured for:
communicating scan information through the second port.

17. Logic encoded in non-transitory media that includes code for execution and when executed by a processor is operable to perform operations comprising:

establishing a first secure tunnel between a configuration manager and a scanner, and a second secure tunnel between a scan controller and the scanner, wherein the scanner is located in a public network and the configuration manager and the scan controller are located in a private network;

communicating scanner configuration information between the scanner and the configuration manager over the first secure tunnel; and communicating scan information between the scanner and the scan controller over the second secure tunnel.

18. The logic of claim 17, wherein each secure tunnel is a reverse Secure Shell (SSH) tunnel.

19. The logic of claim 17, wherein the scanner comprises:

a scan engine configured to scan one or more assets in the private network based on scan information provided by the scan controller; and a configuration agent configured to facilitate configuring the scan engine based on scanner configuration information provided by the configuration manager.

20. The logic of claim 17, wherein establishing the first secure tunnel and the second secure tunnel comprises:

identifying a first origination port, a second origination port, a first destination port, and a second destination port, wherein the first origination port and second origination port are coupled to the scanner, the first destination port is coupled to the configuration manager, and second destination port is coupled to the scan controller; and forwarding, from within the private network, the first origination port to the first destination port to create the first secure tunnel, and the second origination port to the second destination port to create the second secure tunnel.

21. The logic of claim 20, wherein the scanner comprises a first port coupled to the first origination port and a second port coupled to the second origination port.

22. The logic of claim 21, the operations further comprising:
    configuring the scanner to communicate scan information through the second port.

* * * * *

UNITED STATES PATENT AND TRADEMARK OFFICE
CERTIFICATE OF CORRECTION

PATENT NO. : 8,595,822 B2
APPLICATION NO. : 13/340457
DATED : November 26, 2013
INVENTOR(S) : Sven Schrecker et al.

It is certified that error appears in the above-identified patent and that said Letters Patent is hereby corrected as shown below:

On the title page, item (56), in column 2, under "Other Publications", line 2, delete "Niwor," and insert -- Niwot, --, therefor.

Signed and Sealed this
Twenty-fifth Day of February, 2014

Michelle K. Lee
*Deputy Director of the United States Patent and Trademark Office*